(12) United States Patent
Sauerwein et al.

(10) Patent No.: US 8,341,929 B2
(45) Date of Patent: *Jan. 1, 2013

(54) BELT GUARD CROP DAM FOR FLEXIBLE DRAPER HEADER

(75) Inventors: Christopher T. Sauerwein, Newton, KS (US); Gagan Sethi, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/463,909

(22) Filed: May 4, 2012

(65) Prior Publication Data

US 2012/0216500 A1 Aug. 30, 2012

Related U.S. Application Data

(63) Continuation of application No. 12/817,015, filed on Jun. 16, 2010, now Pat. No. 8,205,421.

(51) Int. Cl.
*A01D 43/00* (2006.01)
(52) U.S. Cl. .......................................................... 56/181
(58) Field of Classification Search ............... 56/208, 56/181, 14.5, 158; 198/699, 841, 523
See application file for complete search history.

(56) References Cited

U.S. PATENT DOCUMENTS

| | | | | |
|---|---|---|---|---|
| 1,862,101 A * | 6/1932 | Pax | ................................ | 198/523 |
| 2,347,365 A * | 4/1944 | Paradise | ........................ | 198/699 |
| 2,795,922 A * | 6/1957 | Hume | ............................... | 56/257 |
| 5,459,986 A * | 10/1995 | Talbot et al. | ..................... | 56/181 |
| 6,070,401 A * | 6/2000 | Johnson | .......................... | 56/257 |
| 6,351,931 B1 * | 3/2002 | Shearer | ............................ | 56/181 |
| 7,472,533 B2 * | 1/2009 | Talbot et al. | ..................... | 56/181 |
| 7,478,521 B2 * | 1/2009 | Coers et al. | ...................... | 56/208 |
| 7,478,522 B1 * | 1/2009 | Lovett et al. | ..................... | 56/296 |
| 7,549,280 B2 * | 6/2009 | Lovett et al. | ..................... | 56/208 |
| 7,937,920 B2 * | 5/2011 | Schmidt et al. | .................. | 56/181 |
| 7,975,462 B1 * | 7/2011 | Figgins | ............................ | 56/181 |
| 2002/0129591 A1 * | 9/2002 | Patterson et al. | ............... | 56/158 |
| 2003/0074876 A1 * | 4/2003 | Patterson et al. | ............... | 56/257 |
| 2007/0193243 A1 * | 8/2007 | Schmidt et al. | .................. | 56/181 |
| 2007/0204584 A1 * | 9/2007 | Coers et al. | ...................... | 56/15.8 |
| 2007/0204589 A1 * | 9/2007 | Coers et al. | ...................... | 56/208 |
| 2008/0092508 A1 * | 4/2008 | Talbot et al. | ..................... | 56/181 |
| 2008/0202090 A1 * | 8/2008 | Lovett et al. | ..................... | 56/208 |
| 2009/0007533 A1 * | 1/2009 | Lovett et al. | ................... | 56/14.5 |
| 2009/0084080 A1 * | 4/2009 | Coers et al. | ...................... | 56/15.8 |
| 2009/0266044 A1 * | 10/2009 | Coers et al. | ...................... | 56/208 |
| 2010/0269472 A1 * | 10/2010 | Coers et al. | ...................... | 56/15.8 |

* cited by examiner

*Primary Examiner* — Arpad Fabian-Kovacs
(74) *Attorney, Agent, or Firm* — Hovey Williams LLP

(57) ABSTRACT

Belt guards that overlie the interface between a flexible cutterbar assembly and a flexible draper assembly of a harvesting header define an underlying void region that is sealed against the entry of crop residue by an upright dam wall that bears against the underside of the overhanging belt guards forward of the front edge of the upper run of the belt of the draper assembly. The upright dam wall is on the front extremity of flexible support panels that underlie the upper belt run and may be essentially rigid or provided with a resilient trim seal strip.

9 Claims, 21 Drawing Sheets

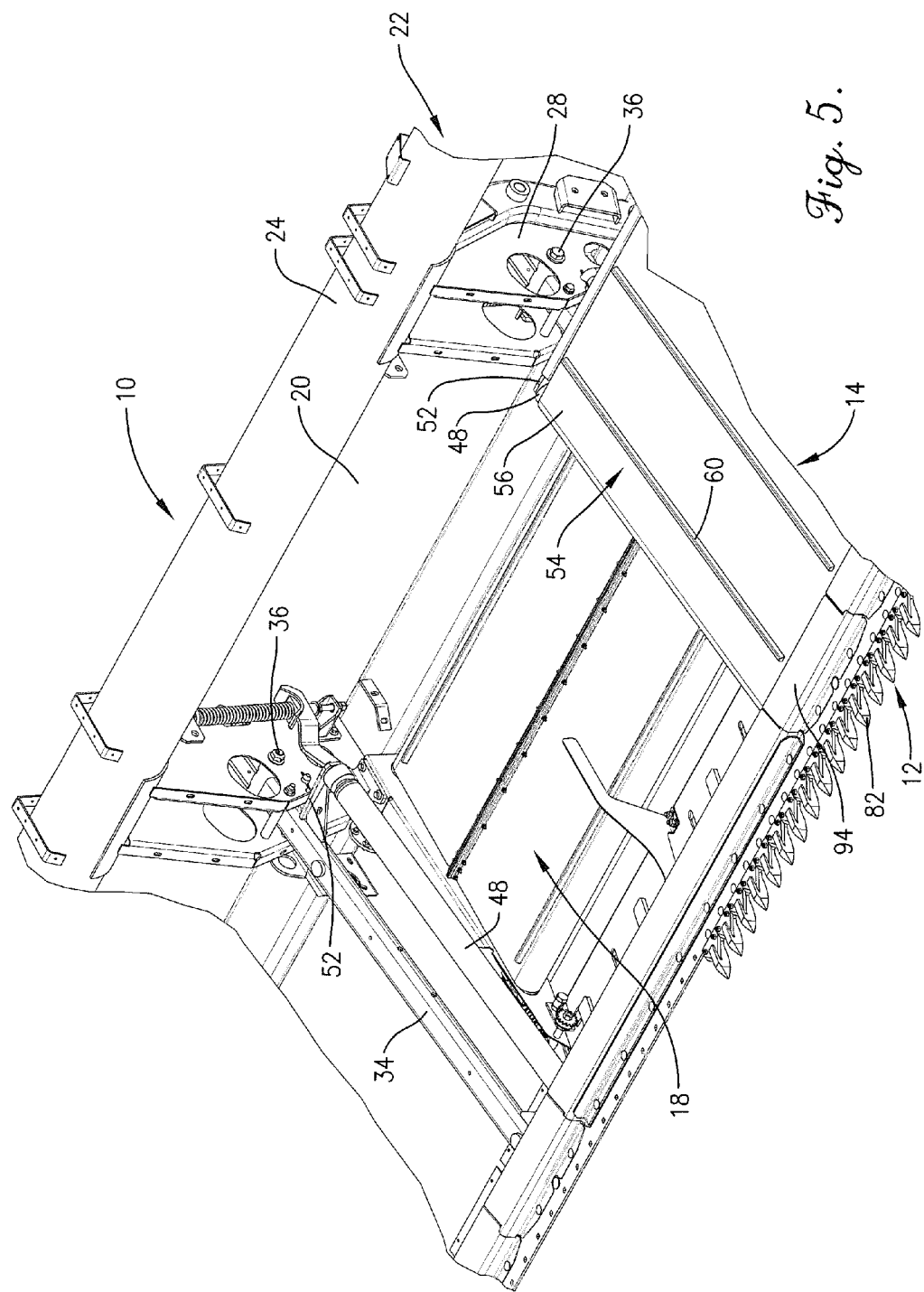

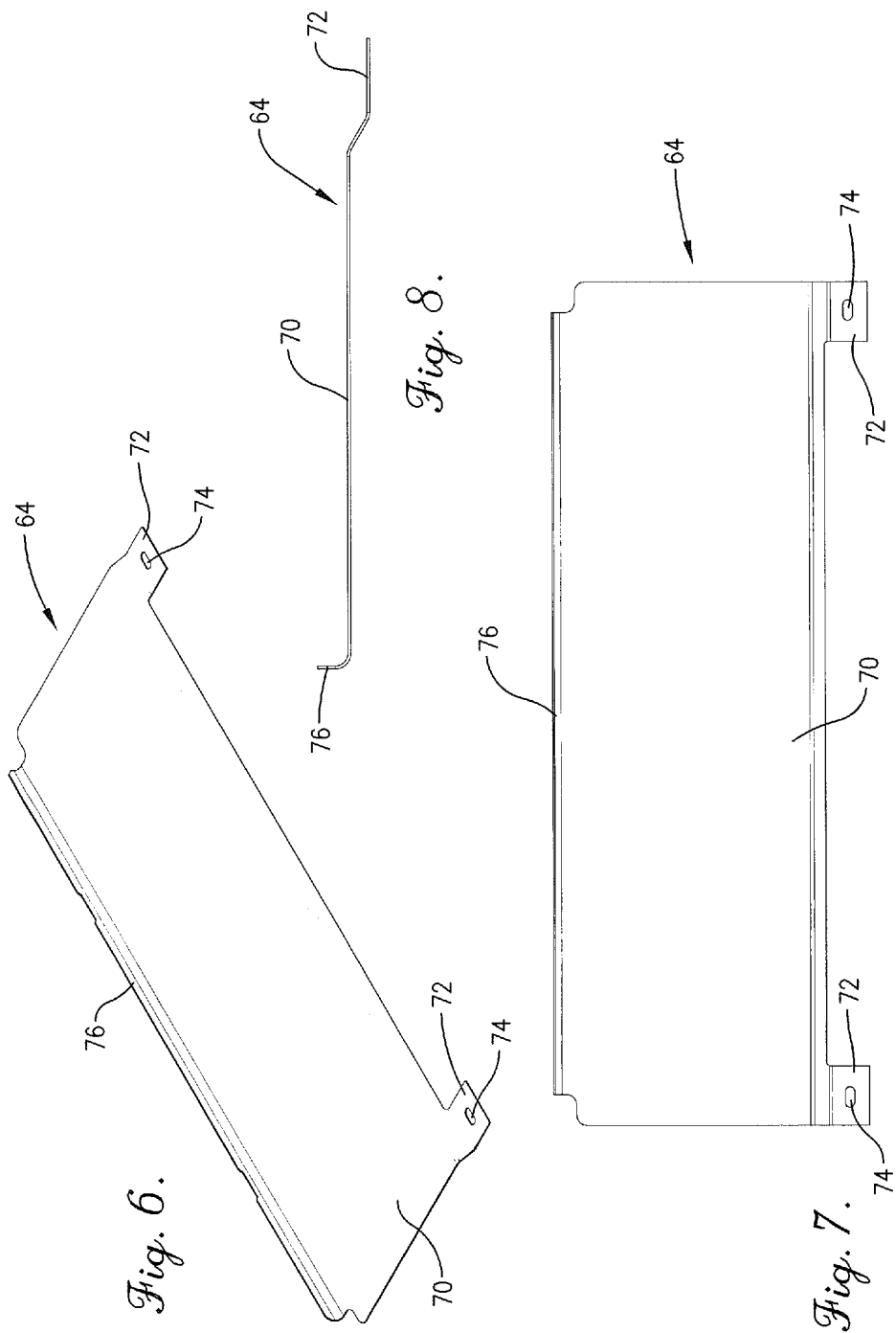

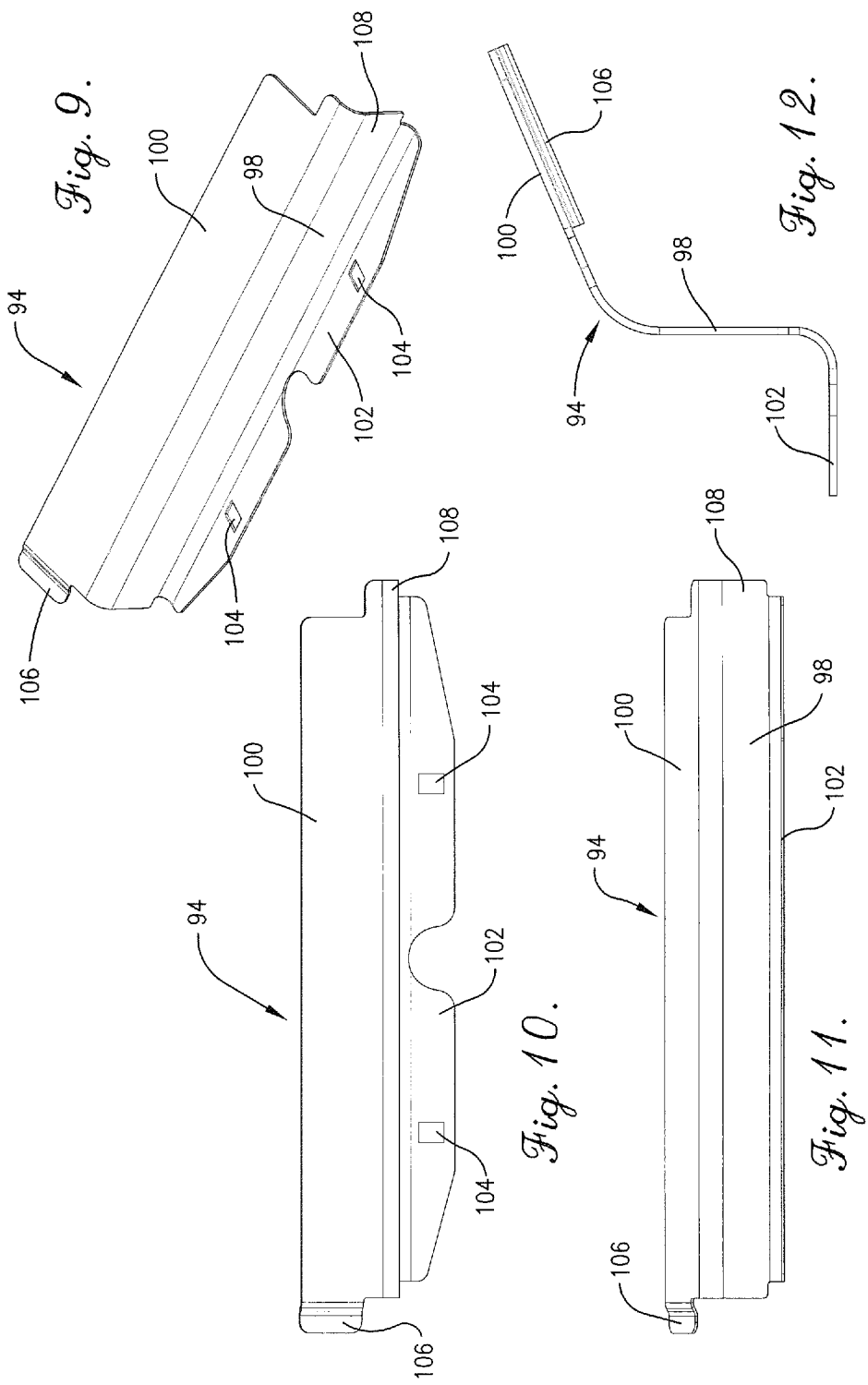

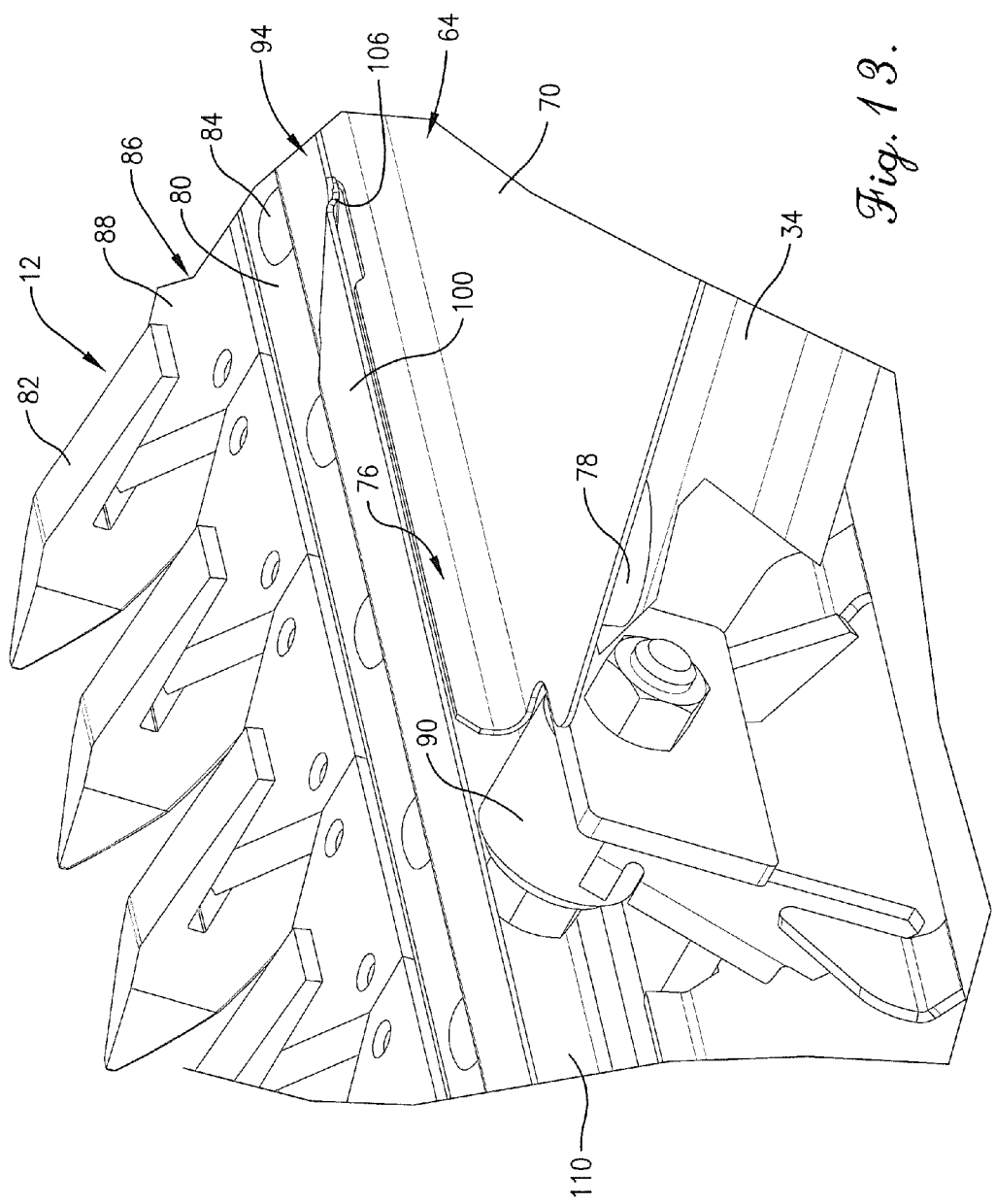

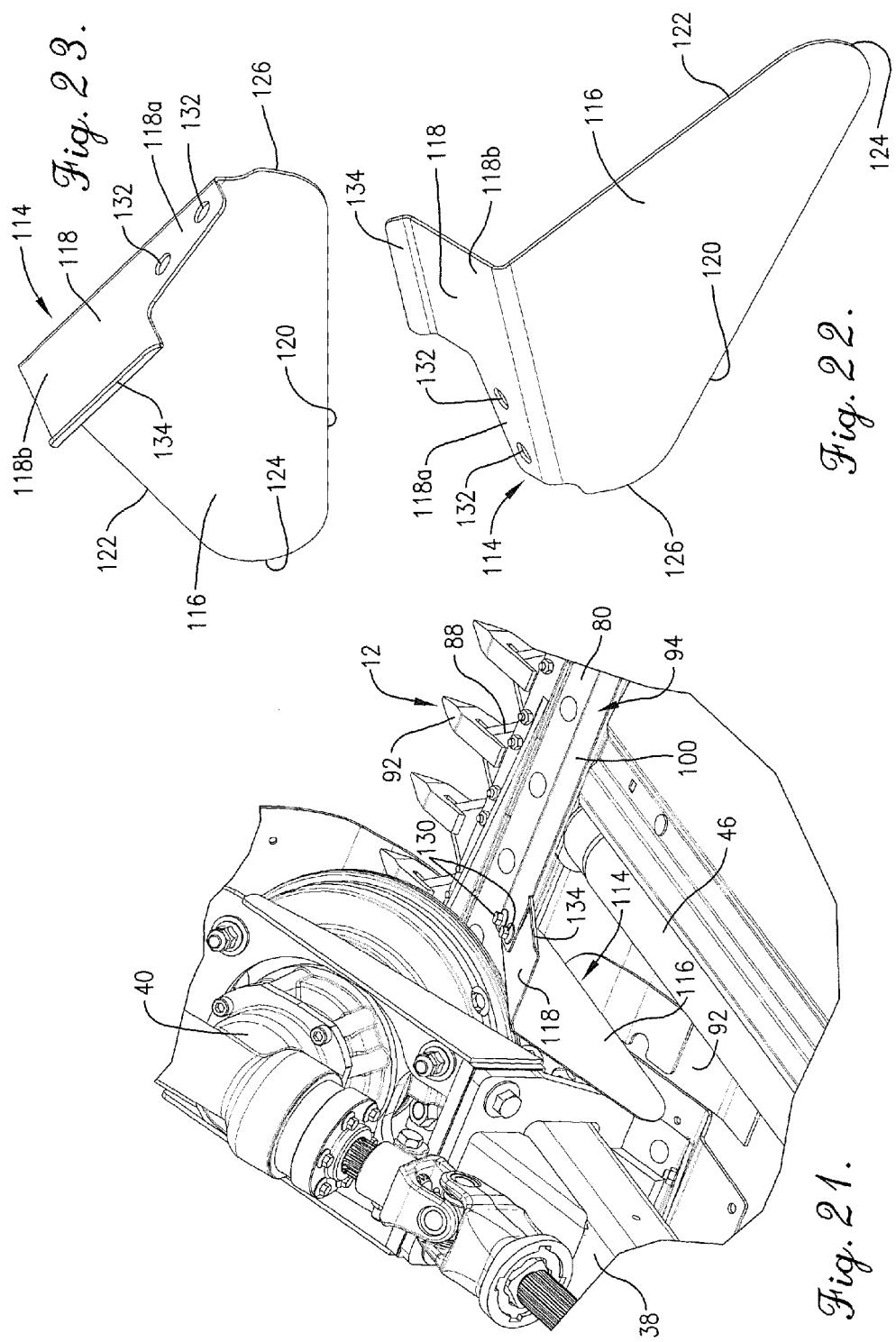

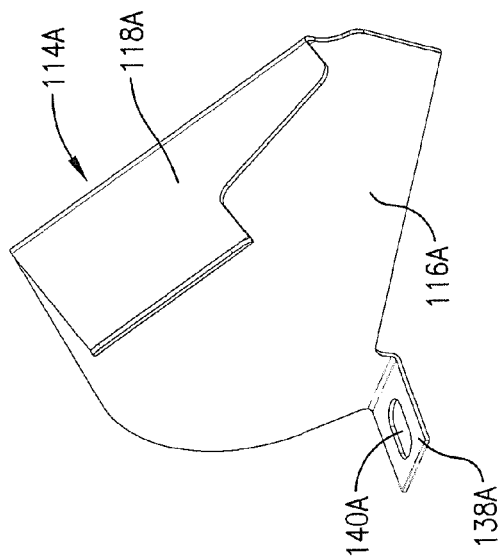
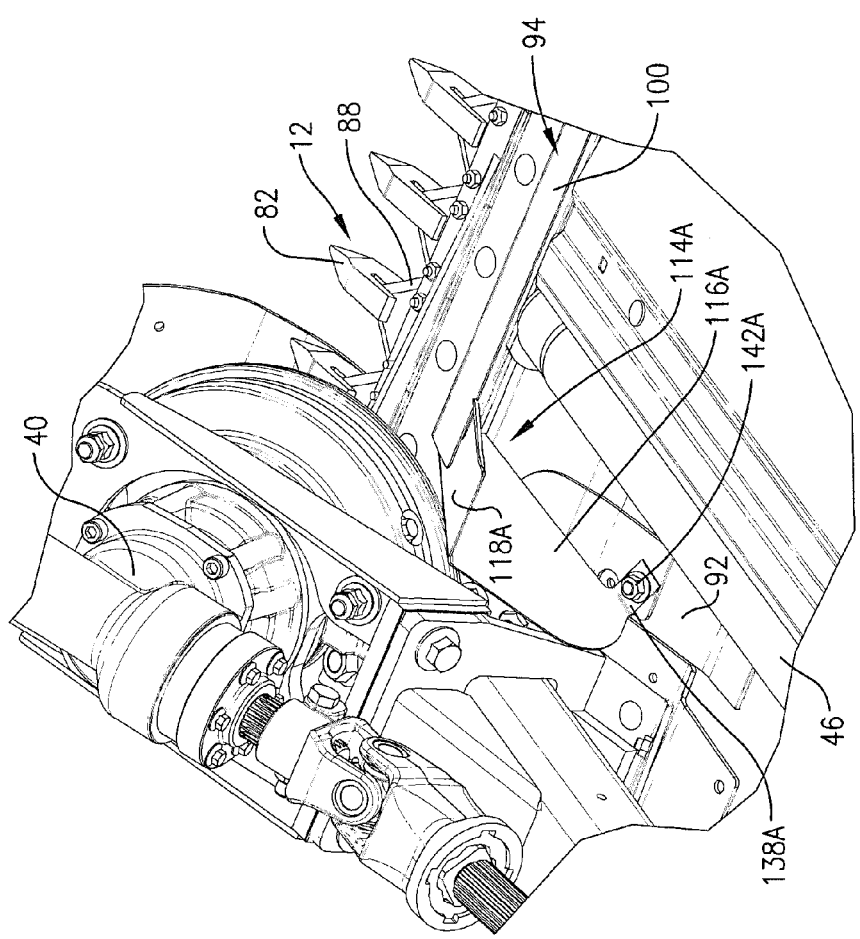

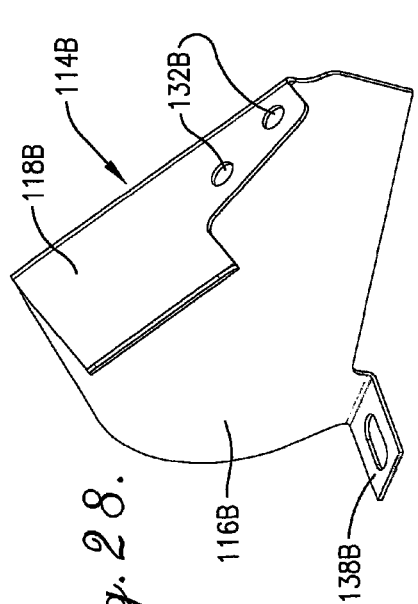
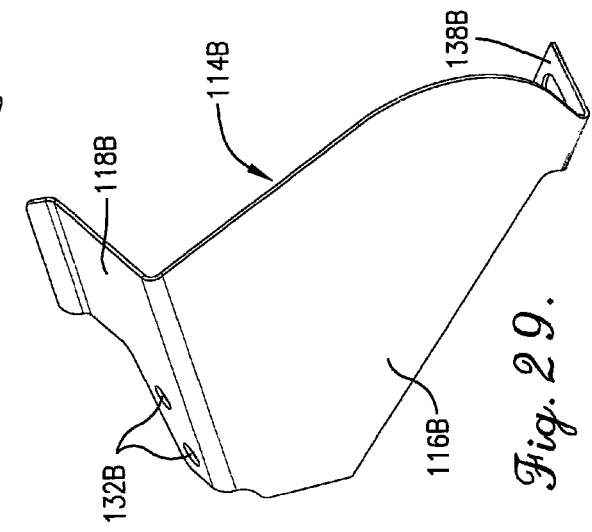
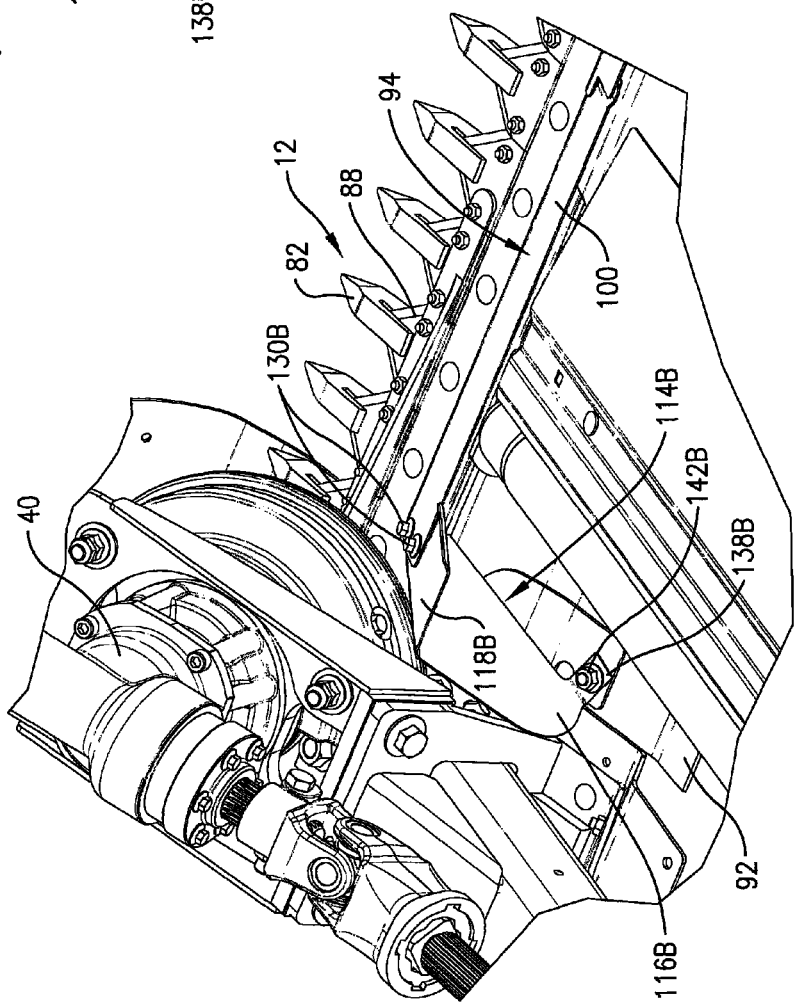

BELT GUARD CROP DAM FOR FLEXIBLE DRAPER HEADER

RELATED APPLICATION

This is a continuation of prior application Ser. No. 12/817,015, filed Jun. 16, 2010, entitled BELT GUARD CROP DAM FOR FLEXIBLE DRAPER HEADER, which is hereby incorporated in its entirety by reference herein.

Application Ser. No. 12/817,015 is related to contemporaneously filed application Ser. No. 12/817,023, titled "Crop Deflector For Ends Of Draper Belt Of Flexible Draper Header" assigned to the assignee of the present invention.

TECHNICAL FIELD

The present invention relates to harvesting headers of the type that are carried on the front end of a combine tractor. More particularly, it relates to flexible draper headers having both a flexible cutterbar assembly and a flexible draper assembly that enable the header to accommodate changes in ground terrain across the width of the header machine as it advances through the field.

BACKGROUND

During grain harvesting operations with draper headers for wheat, soybeans and rice, for example, there is typically a significant amount of crop residue that must be controlled at the header. If the residue is allowed to migrate into the interior of one or both of the left and right draper assemblies of the header, it can become lodged in critical areas and interfere with movement of the draper belts. In severe conditions, it can even cause the draper belts to stall out.

The problem is particularly egregious in the transition region between the cutterbar assembly and the front edges of the draper assemblies because the endless loop in the belts of the assemblies present exposed openings to the interior of the belts in that area. While belt guards in the transition region cover the open front of the draper belt assemblies against ingress of the grain as it is severed and displaced rearwardly, it is a challenge to effectively seal off the area from residue, particularly considering that the cutterbar assembly and draper assemblies are flexing up and down at various locations along their lengths due to changes in ground contour encountered by the advancing harvester.

Previous efforts to seal off this critical area have included the use of an upstanding rib on the exterior of each draper belt along its front edge that engages the underside of overhanging portions of the belt guards as the belt is moving along. This dynamic seal arrangement is disclosed, for example, in Application Publication No. US 2010/0043373 titled "Draper Belt with Crop-Retaining Rib" and assigned to the assignee of the present invention. The construction in the '373 Publication also utilizes an upright stationary wall under the overhanging belt guard and forwardly of the front edge of the top run of the belt, but the top edge of the wall is only in close proximity to the overhanging belt guard with no effort to maintain constant interference contact between the belt guard and the wall. Although the dynamic seal arrangement of the '373 Publication is helpful in reducing residue accumulation in unwanted areas of the header, there is a continuing need for improvement in that respect.

BRIEF DESCRIPTION OF THE DRAWINGS

FIG. 5 is a fragmentary, left front perspective view of the center portion of the header with portions of the right draper assembly broken away to reveal details of construction;

FIG. 6 is a left, rear perspective view of one of the front belt support panels associated with a draper assembly for supporting the upper run of the draper belt during operation;

FIG. 7 is a top plan view thereof;

FIG. 8 is a left end elevational view thereof;

FIG. 9 is a left, front perspective view of a typical belt guard of the draper assemblies;

FIG. 10 is a top plan view thereof;

FIG. 11 is a front elevational view thereof;

FIG. 12 is a left end elevational view of the belt guard;

FIG. 13 is a fragmentary, left, rear perspective view of the front portion of one of the front belt support panels and adjacent belt guards with the draper assembly removed to reveal the relationship between the support panel and the belt guard;

FIG. 21 is a fragmentary, right rear perspective view of the left end of the header illustrating the deflector, the crop divider housing at the left end of the header being removed to reveal details of construction;

FIG. 22 is a perspective view of the deflector as viewed from one side of the deflector;

FIG. 23 is a perspective view of the deflector as viewed from the opposite side of the deflector;

FIG. 25 is a fragmentary, right rear perspective view of the left end of the header with parts removed to reveal a second embodiment of the residue deflector wherein the deflector is attached to a skid plate of the header for support;

FIG. 26 is a perspective view of the deflector embodiment of FIG. 25 illustrating details of construction;

FIG. 27 is a fragmentary right rear perspective view of the left end of the header with components removed to reveal a third embodiment of residue deflector wherein the deflector is attached to both the endmost belt guard and a skid plate;

FIG. 28 is a perspective view taken from one side of the third embodiment of residue deflector of FIG. 27;

FIG. 29 is a perspective view of the opposite side of the third embodiment of residue deflector;

DETAILED DESCRIPTION

Figure 1:
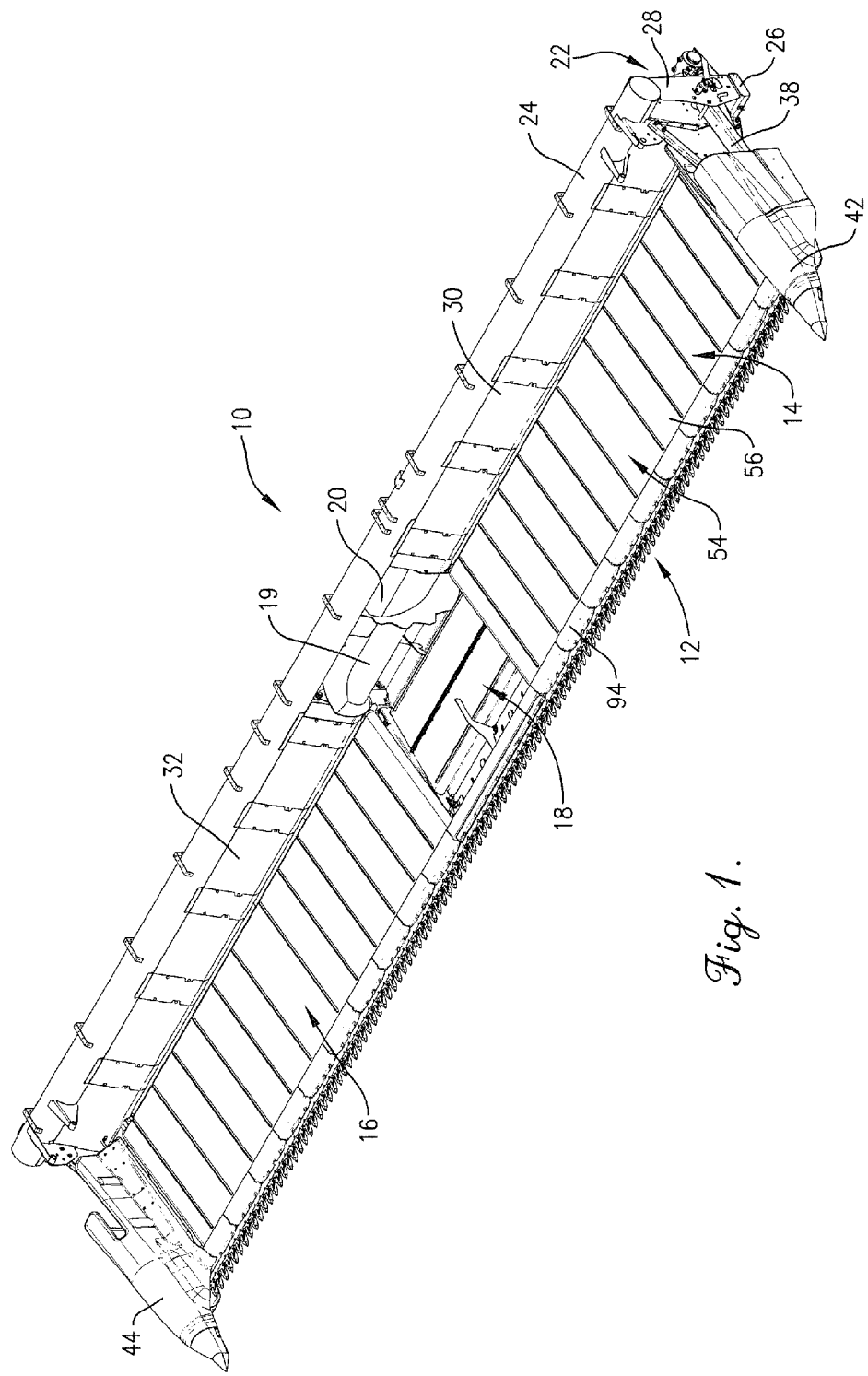
FIG. 1 is a left, front perspective view of a harvesting header constructed in accordance with the principles of the present invention.
Figure 2:
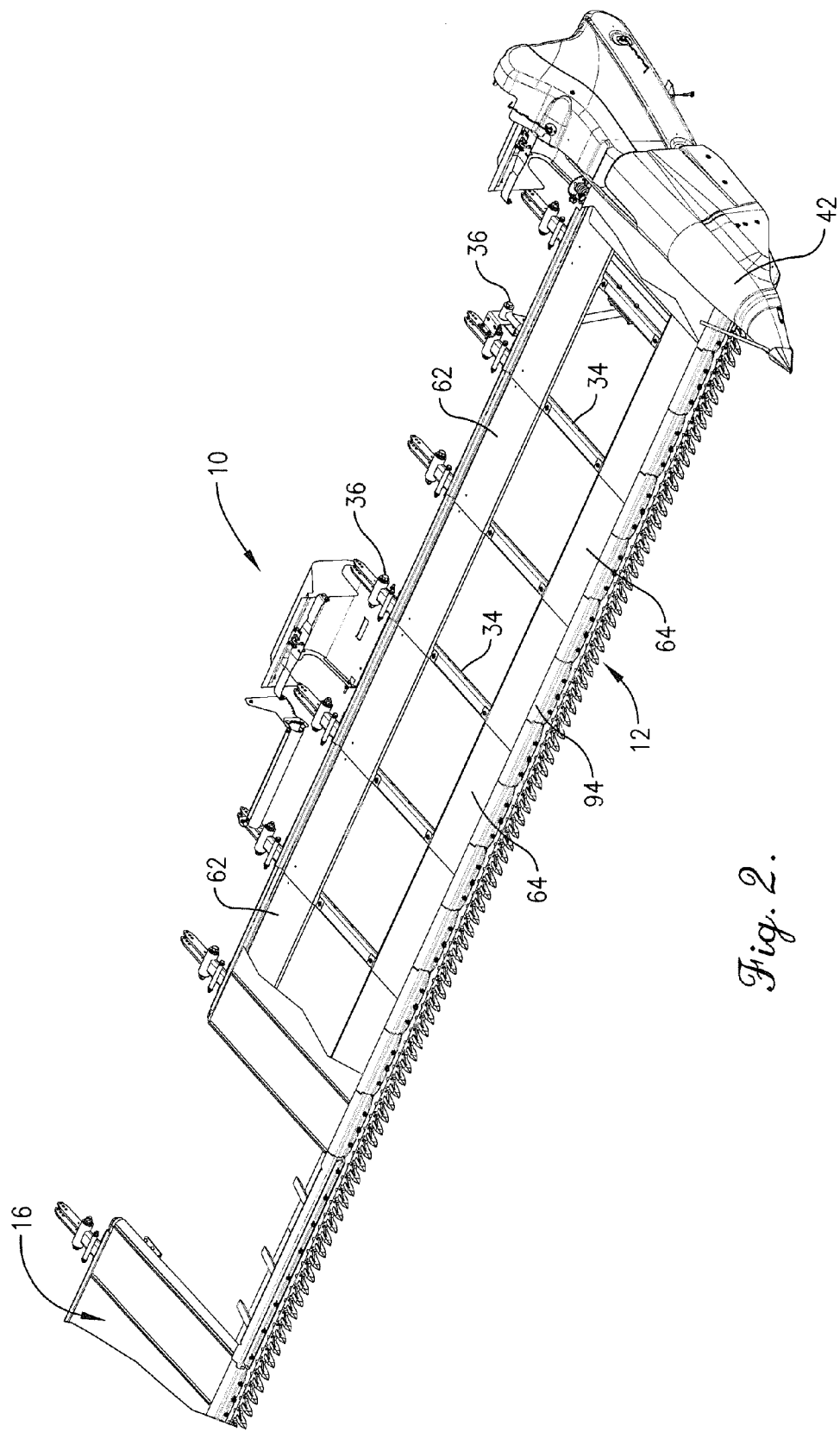
FIG. 2 is an enlarged, fragmentary perspective of the header with parts broken away to reveal details of construction.

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References hereinafter and heretofore made to certain directions, such as, for example, "front", "rear", "left", and "right", are made as viewed from the rear of the machine looking forwardly.

With initial reference to FIGS. 1-5, a harvesting header 10 in accordance with the principles of the present invention is adapted to be attached to the front of a feeder house (not shown) which is in turn part of a combine tractor (not shown) that supports header 10 for advancement across a field containing standing crops to be harvested. Generally speaking, as header 10 is advanced, standing crops are severed by a cutterbar assembly 12 across the front of header 10, and such severed materials fall rearwardly onto left and right side draper assemblies 14, 16 respectively. Side draper assemblies 14, 16 convey the severed materials toward the center of header 10 where they fall onto a center, rearwardly moving draper assembly 18 for conveyance toward the feeder house. Of course, standing crops directly in front of center draper assembly 18 are severed by a corresponding central portion of cutterbar assembly 12. A transfer auger 19 at the rear of center draper assembly 18 within a discharge opening 20 assists in moving the crop materials into the feeder house for subsequent processing by the combine tractor.

Figure 3:
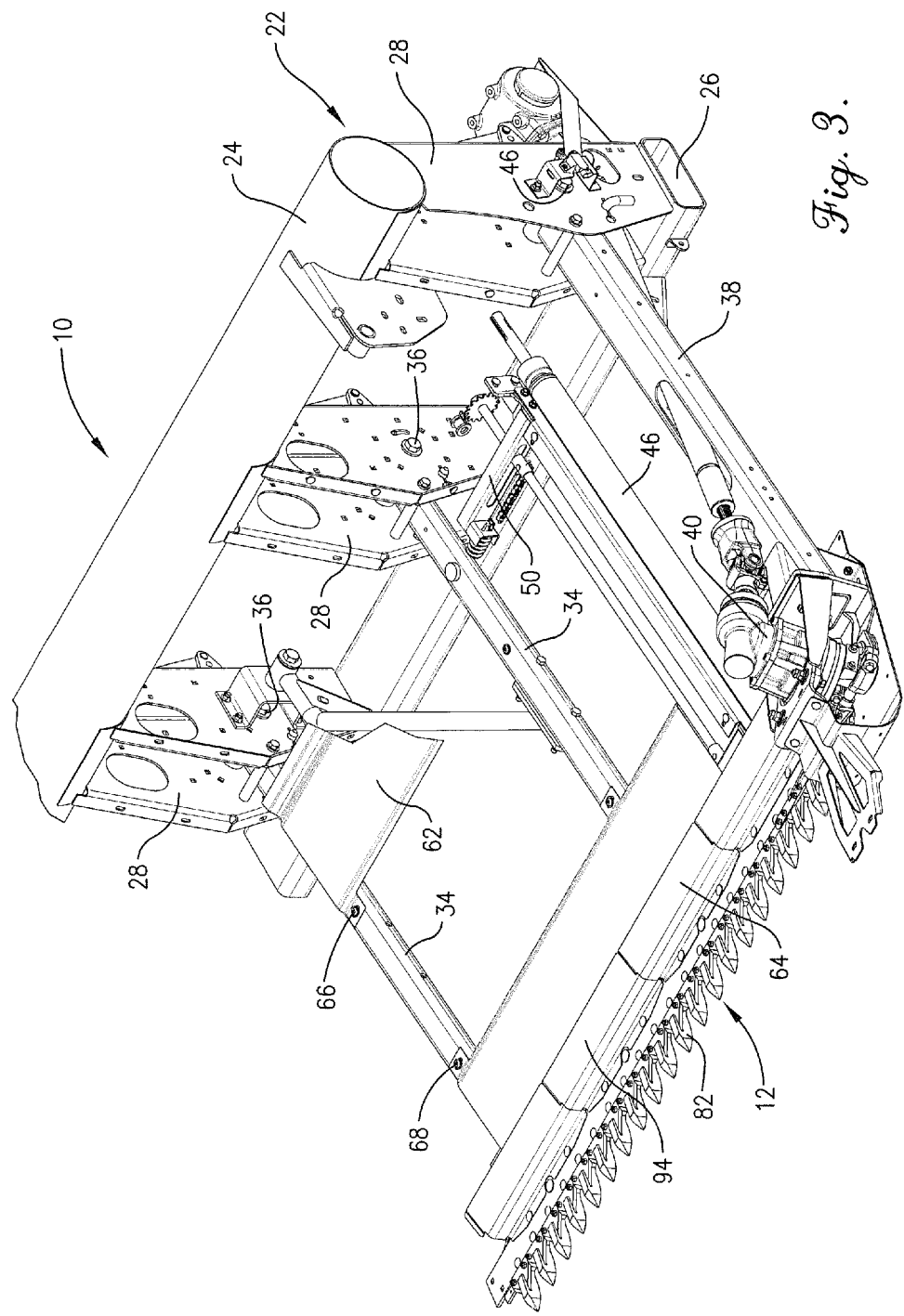
FIG. 3 is a further enlarged, fragmentary left front perspective view of the header with the left end of the left draper assembly removed to reveal details of construction.
Figure 4:
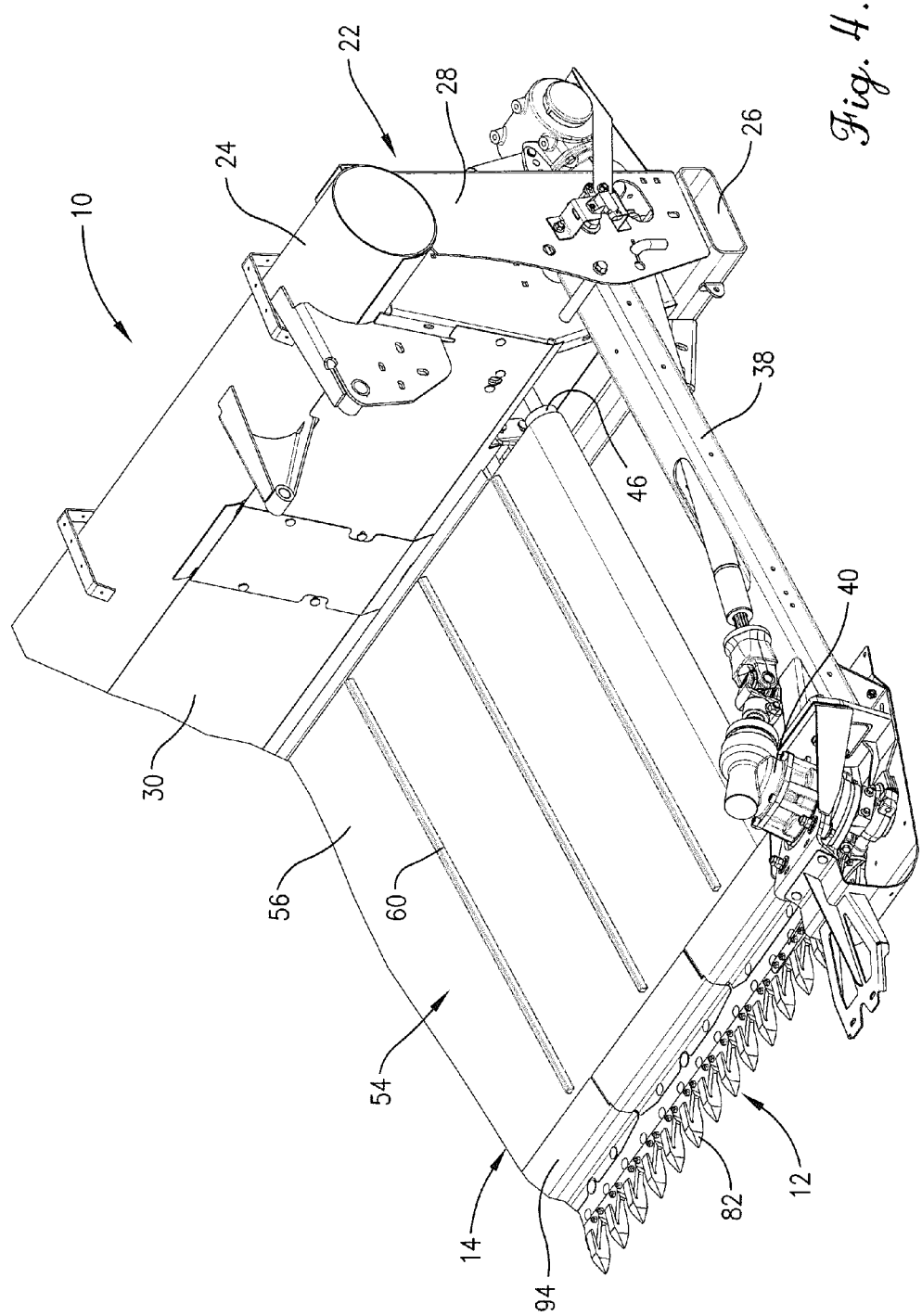
FIG. 4 is a fragmentary, left front perspective view of the header similar to FIG. 3 but with the left draper belt in place.

Header 10 includes an upright, generally rectangular, ladder-shaped frame 22 that extends across the full length of the header at its rear extremity, the frame 22 being adapted through means not shown to mount onto the front end of the feeder house for support thereby. As illustrated in FIG. 3, for example, frame 22 includes an upper, transverse cylindrical beam 24, a lower transverse, rectangular beam 26, and a number of upright channels 28 that interconnect upper and lower beams 24, 26 at spaced locations along the length of frame 22. A pair of upright panels 30, 32 on opposite lateral sides of discharge opening 20 cover the otherwise exposed front extremities of channels 28.

Cutterbar assembly 12 is flexible all along its length (with the exception of a center portion directly in front of center draper assembly 18) for accommodating differences in ground contour between different portions of the cutterbar assembly. Likewise, side draper assemblies 14, 16 are flexible along their lengths so as to rise and fall with corresponding portions of the flexing cutterbar assembly 12. The construction of header 10 permitting such flexing corresponds substantially to that disclosed in the above-noted Application Publication No. US 2010/0043373; therefore, the '373 Publication in its entirety is hereby incorporated by reference into the present specification to disclose details of construction of header 10 that might not otherwise be specifically described in the present specification and drawings.

In order to achieve the desired flexibility for cutterbar assembly 12 and draper assemblies 14, 16, each draper assembly 14, 16 is provided with a plurality of fore-and-aft extending, laterally spaced apart float arms 34 pivoted at their rear ends to header frame 22 for up and down swinging movement about transverse pivots 36 on channels 28. In addition, at opposite outboardmost ends of header 10, a pair of outboard arms 38 are provided (only the left outboard arm being illustrated) to support opposite ends of cutterbar assembly 12 and a drive mechanism 40 for cutterbar assembly 12. As disclosed in the incorporated '373 Publication, preferably cutterbar assembly 12 includes a split sickle comprising two oppositely moving sickle bar half assemblies that overlap slightly in the center of the header but are driven at their outboard ends by their own individual drive mechanisms 40. Thus, it is preferred, although not required, that a pair of drive mechanisms 40 be provided at opposite ends of header 10, one supported on each of the outboard arms 38 in the manner illustrated in FIGS. 3 and 4, for example. Left and right divider housings 42 and 44 respectively normally cover drive mechanisms 40 and are carried on the outboard arms 38 for up and down movement therewith. Arms 38 are pivoted at their rear ends to the most outboard channels 28 by transverse pivots 46.

Cutterbar assembly 12 is attached to and supported by the front ends of arms 34, 38. Likewise, each draper assembly 14, 16 is supported by arms 34 such that, as terrain changes cause a particular portion of cutterbar assembly 12 to rise or fall, the corresponding arm 34 rises or falls with it, causing a corresponding rise or fall of the associated draper assembly portion. For the sake of this description, arms 34 may be considered as part of the draper assemblies 14, 16.

Figure 14:
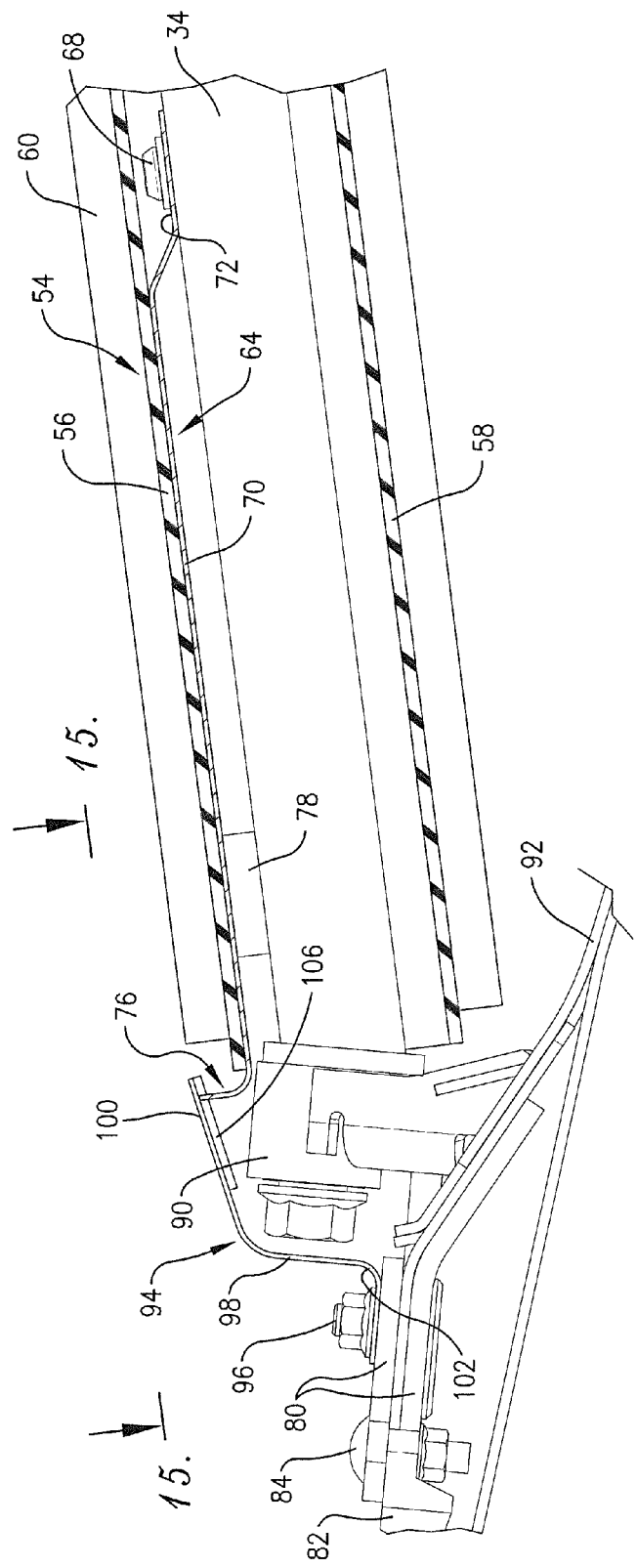
FIG. 14 is a fragmentary, vertical cross-sectional view of the front end of the header taken along a fore-and-aft line to illustrate the relationship between the draper belt, support panel, and belt guard.
Figure 17:
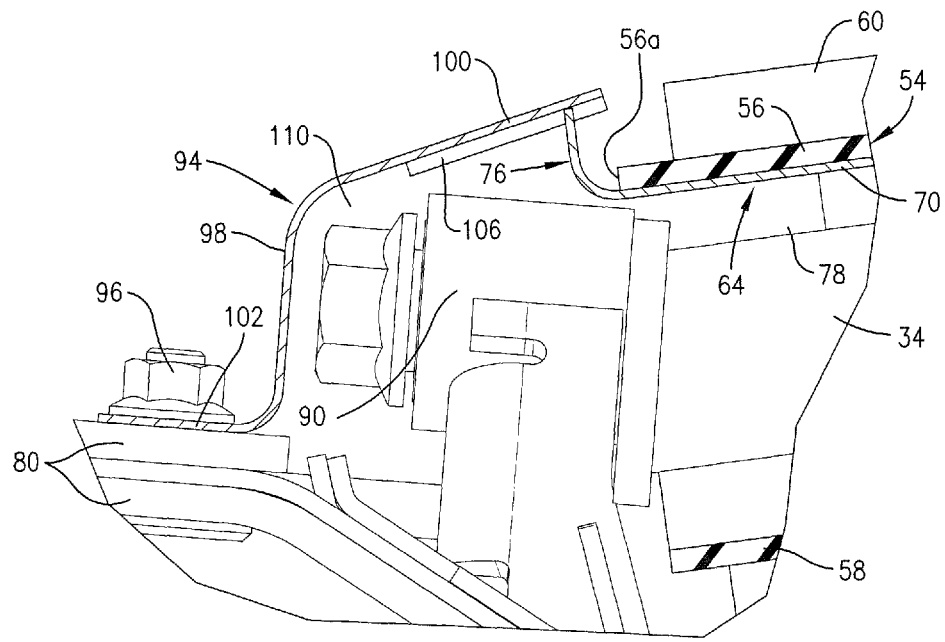
FIG. 17 is a fragmentary, longitudinal cross-sectional view of the front end of the header similar to FIG. 14 but on a larger scale to illustrate the relationship between the front dam wall of the belt support panel, the front edge of the upper belt run, and the belt guard.

As illustrated primarily with respect to left draper assembly 14, each of the draper assemblies 14, 16 includes a pair of fore-and-aft extending, laterally spaced apart rollers 46 and 48 at opposite outboard and inboard ends respectively of the draper assembly. Each outboard roller 46 is supported by a proximal arm 34 by means of a pair of cantilever supports 50 at opposite front and rear ends of the arm 34 (only the rear support 50 being visible in FIG. 3). Each outboard roller 46 is adjustably shiftable laterally on its supports 50 for the purpose of adjusting the tension the draper assembly as necessary or desired. At the opposite inboard end of each draper assembly, the inboard roller 48 is supported in a non-adjustable manner by cantilever supports 52 (only the rear support 52 being visible in FIG. 5), as illustrated by inboard roller 48 associated with the right draper assembly 16 in FIG. 5. Each draper assembly 14, 16 further includes an endless, wide, flat, rubberized, flexible belt 54 looped around rollers 46, 48 to present upper and lower belt runs 56 and 58 respectively. (See also FIGS. 14, 17, and 18). Belt 54 is provided with a number of fore-and-aft extending, laterally spaced apart slats 60 to enhance the ability of belt 54 to convey crop materials in the desired manner.

Belt 54 is driven by outboard roller 46 in such a manner that upper run 56 moves laterally inwardly toward the center of header 10, i.e., toward center discharge draper assembly 18. Outboard roller 48 is driven by means not illustrated. It will be appreciated that arms 34 are disposed within the interior of belt 54, between upper run 56 and lower run 58 at the same level as rollers 46, 48.

Arms 34, 38 are supported by frame 22 in such a manner that draper assemblies 14, 16 and divider housings 42, 44 are inclined slightly downwardly and forwardly from rear frame 22 toward the ground. The weight of the arms 34, 38 and their associated apparatus is partially counterbalanced by a flotation system (not illustrated) at the upper rear ends of arms 34, 38 as more fully disclosed in the incorporated '373 Publication.

The upper belt run 56 is supported at its front and rear by a set of rear support panels 62 and a set of front support panels 64, both of which are carried by arms 34. Panels 62, 64 extend from the centerline of one arm 34 to the centerline of the next adjacent arm 34, with the exception of the outboardmost panels 62, 64 which are somewhat longer than the other panels and project somewhat beyond the last arm 34 (FIG. 3). Rear panels 62 are attached at their front edges to arms 34 by bolts 66, while front panels 64 are attached at their rear edges to arms 34 by bolts 68.

FIGS. 6-8 illustrate details of construction of a typical front panel 64. Each front panel 64 comprises a flexible body of sheet metal that is formed to present a raised, flat central portion 70 that bears against the underside of upper belt run 56 and a rearwardly disposed recessed portion 72 that is in the form of a pair of spaced apart tabs engaging the underlying arm 34 and receiving bolts 68 through holes 74. Along its front extremity, front panel 64 has an upwardly projecting dam wall or barrier 76 formed by the upturned front margin of panel 64. Dam wall 76 functions to keep residue from migrating to the inside of belt 54 as hereinafter explained in more detail. The recessed nature of tabs 72 relative to raised central portion 70 permits the heads of bolts 68 to be spaced below upper belt run 56 and thereby avoid abrasive wear of those structures. A spacer 78 on each arm 34 (FIG. 14) underlies the raised central portion 70 of front panel 64 so as to maintain central portion 70 and upper belt run 56 spaced above arm 34.

Cutterbar assembly 12 includes a long, transversely extending, flexible cutterbar 80 along the full width of header 10, a series of sickle guards 82 attached to cutterbar 80 by carriage bolts 84, and a reciprocating split sickle bar assembly 86 having knife sections 88 that cooperate with guards 82 to sever standing crop materials. Cutterbar assembly 12 is attached to arms 34 by coupling units 90 at the front ends of the arms, and ground-engaging skids 92 are fixed to coupling units 90 and cutterbar 80 to support the front of header 10 on the ground.

The front of belt 54 between upper run 56 and lower run 58 is open, and upper run 56 is slightly elevated with respect to cutterbar assembly 12. Thus, to facilitate the flow of cut materials from cutterbar assembly 12 to upper belt run 56, and to prevent such materials from entering the open front interior of belt 54, a series of formed belt guards 94 cover the interface between cutterbar assembly 12 and draper assemblies 14, 16. Belt guards 94 are attached to cutterbar 80 by a series of bolts 96 and effectively form a continuous cover over the otherwise exposed, open front end of belt 54. The segmented or sectionalized nature of this protective cover, however, due to the use of individual belt guards 94 instead of a single, unitary cover, allows covering protection even as cutterbar assembly flexes during harvesting operations. As explained in greater detail in the incorporated '373 Publication, joints are formed between slightly overlapping ends of the belt guards 94 to facilitate the needed flexing action.

Figure 15:
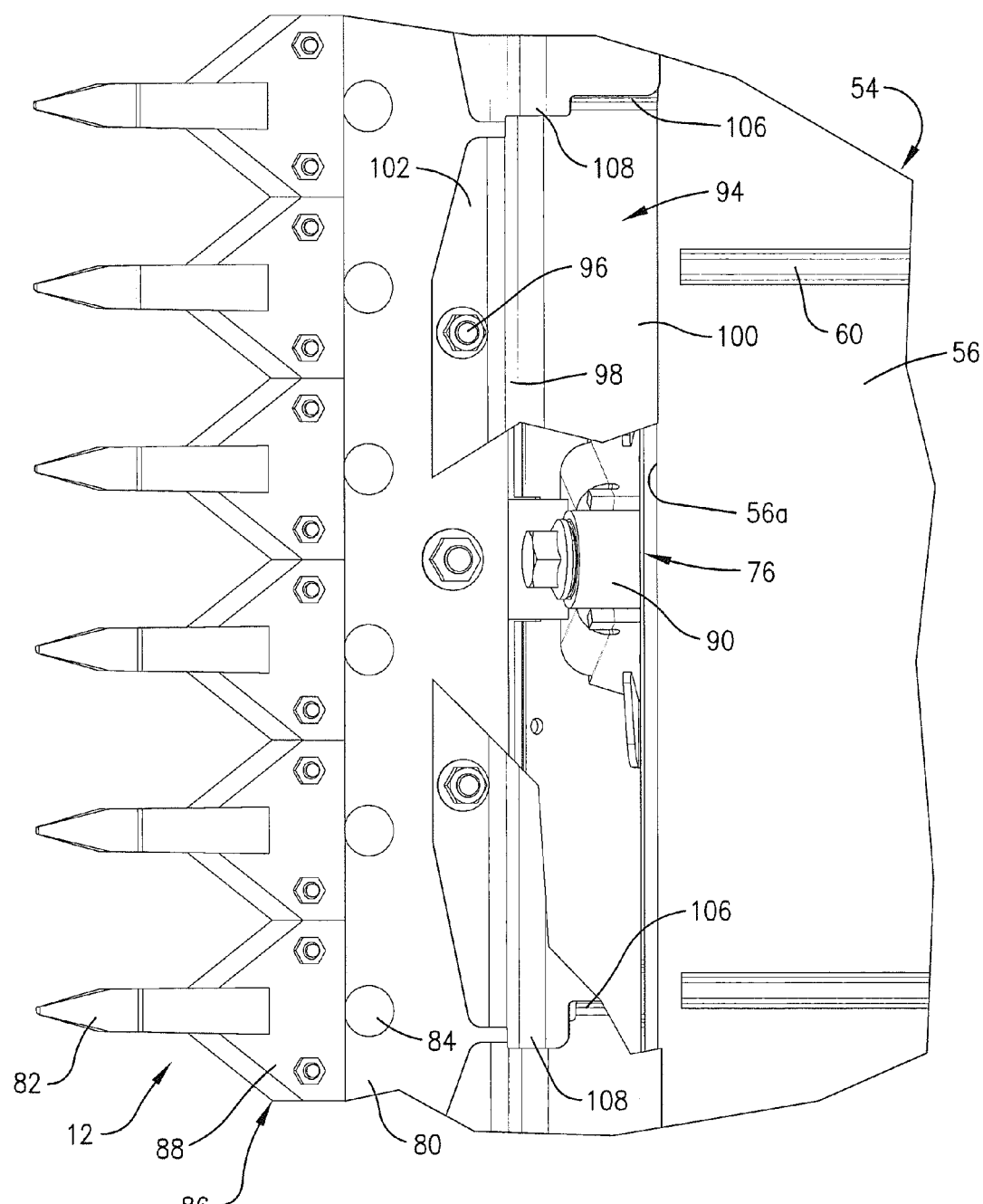
FIG. 15 is a fragmentary, top plan view of the front end of the header taken substantially along line 15-15 of FIG. 14 to reveal the relationship between the front dam wall on the belt support panel, the front edge of the upper belt run, and the belt guard.
Figure 16:
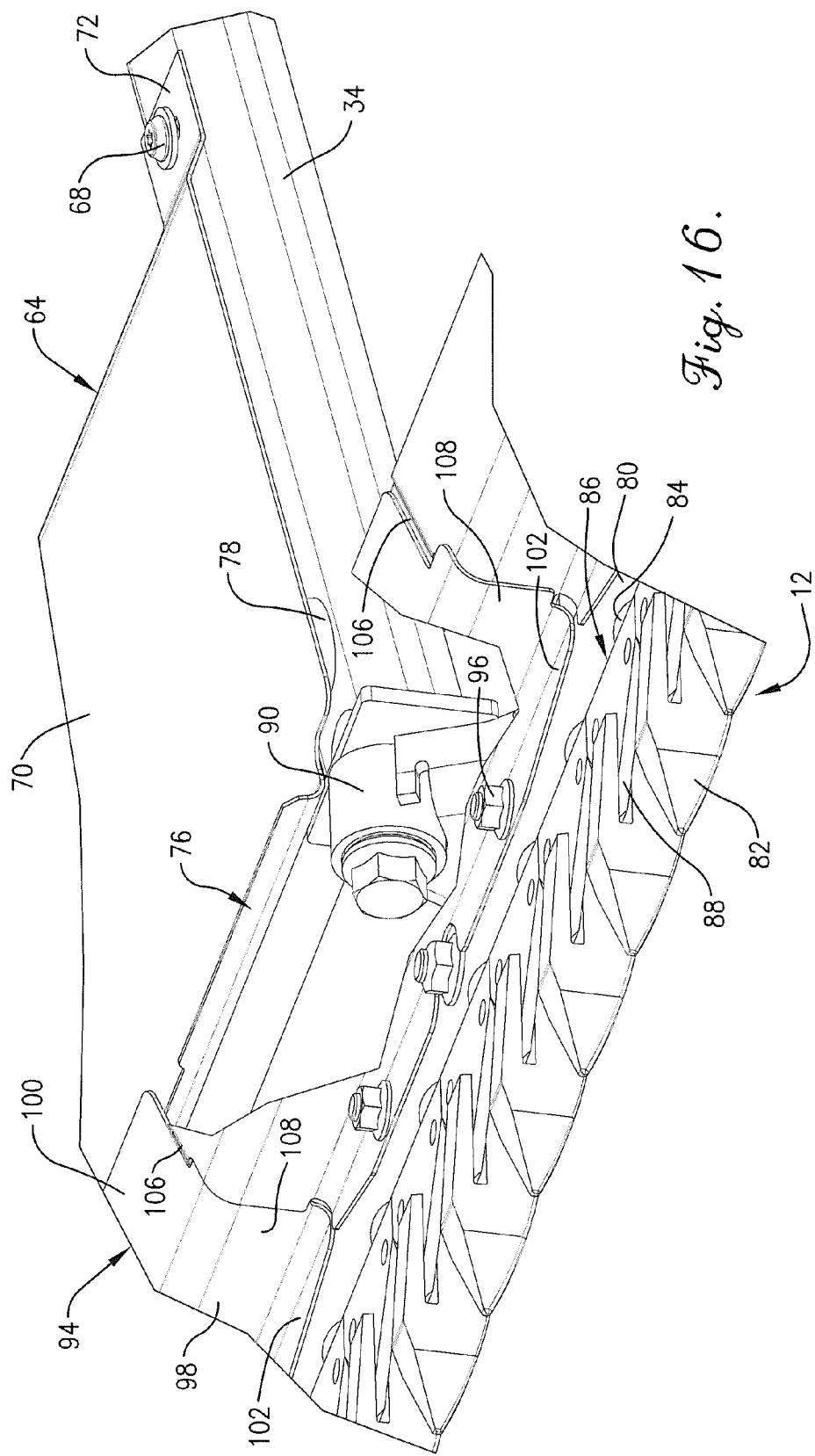
FIG. 16 is a fragmentary, left front perspective view of the front end of the header with portions of one of the belt guards broken away to reveal details of construction.

FIGS. 9-12 illustrate some of the constructional details of most of the belt guards 94 (the outboardmost guards at opposite ends of cutterbar assembly are slightly different). As illustrated in those figures, each guard 94 comprises a single unitary piece of formed sheet metal having a moderate degree of inherent flexibility sufficient to meet the requirements of flexing with cutterbar assembly 12. Guard 94 is somewhat generally S-shaped in transverse cross-sectional configuration, presenting an upright section 98, a rearwardly projecting overhanging section 100 at the upper margin of upright section 98, and a forwardly projecting, horizontal mounting section 102 at the lower margin of upright section 98. Bolts 96 pass through holes 104 in mounting section 102 when guards 94 are attached to cutterbar 80. A laterally projecting rear tab 106 projects in an inboard direction from the normally inboard end of overhanging section 100 and is joggled down slightly below the level of overhanging section 100. This arrangement is for the purpose of allowing tab 106 to slip under the proximal outboard end of the next adjacent inboard belt guard 94. The outboard end of guard 94 is notched slightly in the region of overhanging section 100 so as to present an outboard projecting tab 108 in upright section 98 and part of overhanging section 100. FIGS. 15 and 16 illustrate that while inboard tab 106 always slips under the overhanging section 100 of the next adjacent inboard guard 94, the outboard tab 108 alternately slips over and under the upright section 98 of the next adjacent outboard guard 94. That is, successive tabs 108 in the series slip alternately over and under the upright sections 98 to provide an interlocking yet flexible joint between the guards. Each outboardmost guard 94 has no interlocking tab 108. However, in one embodiment of the invention, the overhanging section 100 is provided with a pair of mounting holes 109 (FIG. 19; only one hole 109 being illustrated) for a purpose yet-to-be described.

With particular reference to FIGS. 13-17, it will be seen that overhanging section 100 of belt guards 94 overhangs upright dam wall 76 of front panel 64 but does not substantially overhang the front edge 56a of upper belt run 56. Moreover, belt 54 is devoid of an upstanding exterior rib adjacent front edge 56a in contrast to the construction illustrated in the incorporated '373 Publication wherein a belt rib, moving with the belt, contacts the stationary overhanging portion of the belt guard in an effort to make a dynamic seal. In the embodiment of FIGS. 13-17, dam wall 76 projects upwardly a sufficient distance as to be in interference engagement with overhanging portion 100 (i.e., exerting at least a slight upward force against guard portion 100) at all times, even during flexing of the header. Dam wall 76 and overhanging portion 100 thus cooperate to effectively close off and seal the upper rear extremity of a void region 110 that is defined under guard 94 and forwardly of belt 54. Void region is in open communication with the open front of belt 54 between runs 56, 58; therefore, the seal formed by dam wall 76 and overhanging portion 100 prevents residue along the front belt edge 56a from migrating under overhanging portion 100, through void region 110, and into the open front of belt 54. Instead, the residue is simply encouraged by the moving upper belt run 56 to slide along the rear side of dam wall 76 and drop into the central draper assembly 18.

By having a slight amount of extension of overhanging portion 100 beyond upright dam wall 76, there is less likelihood that a significant space will accidently open up between the upper edge of dam wall 76 and overhanging portion 100 during flexing of the various components in that area of the header. Moreover, while in the most preferred embodiment the rearmost edge of belt guard 94 does not overlap front edge 56a of the upper belt run 56, some small degree of overlap is permissible, although unnecessary, because there is no upstanding exterior rib on the belt that needs to make contact with overhanging portion 100.

Figure 18:
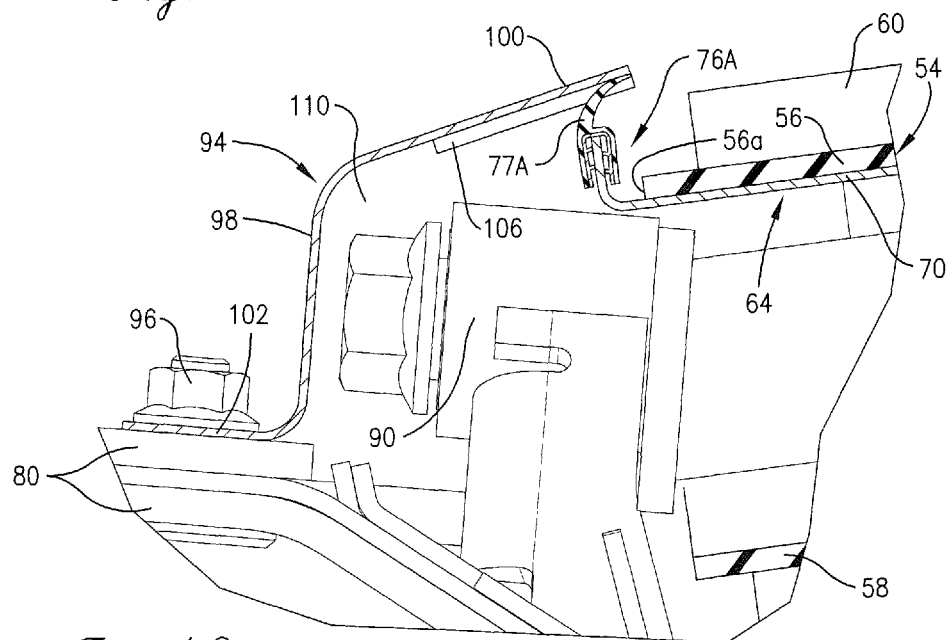
FIG. 18 is an enlarged, fragmentary, longitudinal cross-sectional view of the front end of the header illustrating an alternative embodiment of the front dam wall on the belt support panel.

FIG. 18 illustrates an alternative embodiment for dam wall 76 of front panel 64. In this embodiment, dam wall 76A has a lower upright portion integral with the rest of the panel, and an upper attached portion comprising a flexible trim seal assembly 77A that makes constant yieldable interference engagement with the underside of overhanging portion 100 of belt guard 94. Trim seal 77A is preferably made of a suitable resilient material and may take the form of a poly vinyl chloride (PVC) trim seal strip available from Trim-Lok Inc. of Buena Park, Calif. as "EPDM Co-Extruded Trim-Seal", product ID: DDA1501. Like the first embodiment, the alternative embodiment of FIG. 18 has belt 54 devoid of an upstanding exterior rib that would engage the underside of overhanging portion 100 to make a dynamic seal. Preferably, in the alternative embodiment of FIG. 18, overhanging portion 100 extends rearwardly a sufficient extent as to permit trim seal 77A to bend and deflect rearwardly without projecting beyond the rear edge of overhanging portion 100.

Crop Residue Deflector

Figure 19:
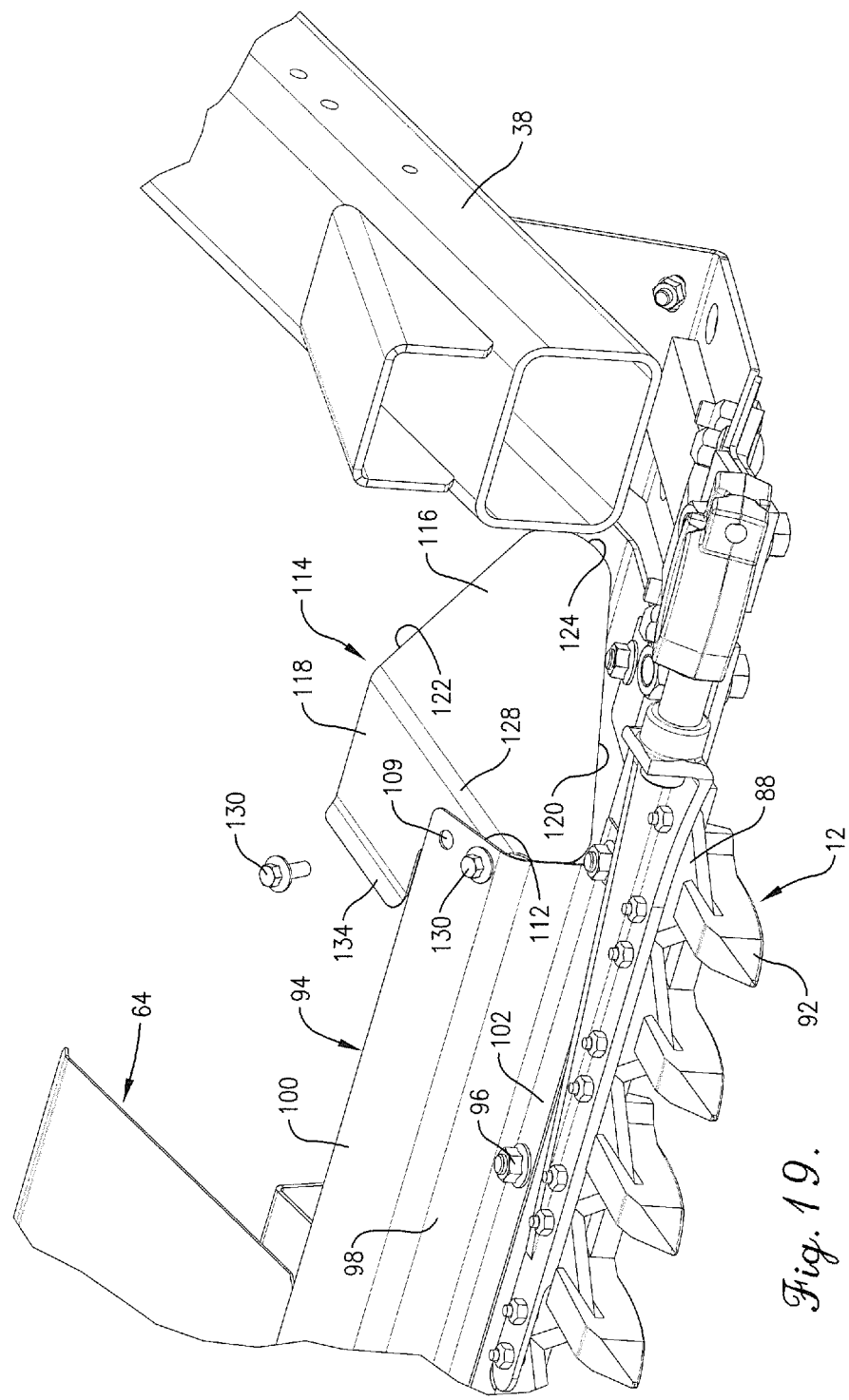
FIG. 19 is a fragmentary, left front perspective view of the left front corner of the header illustrating the manner in which a residue deflector is attached to and closes off the otherwise open end of the endmost belt guard so as to protect against the ingress of crop residue in that area.
Figure 20:
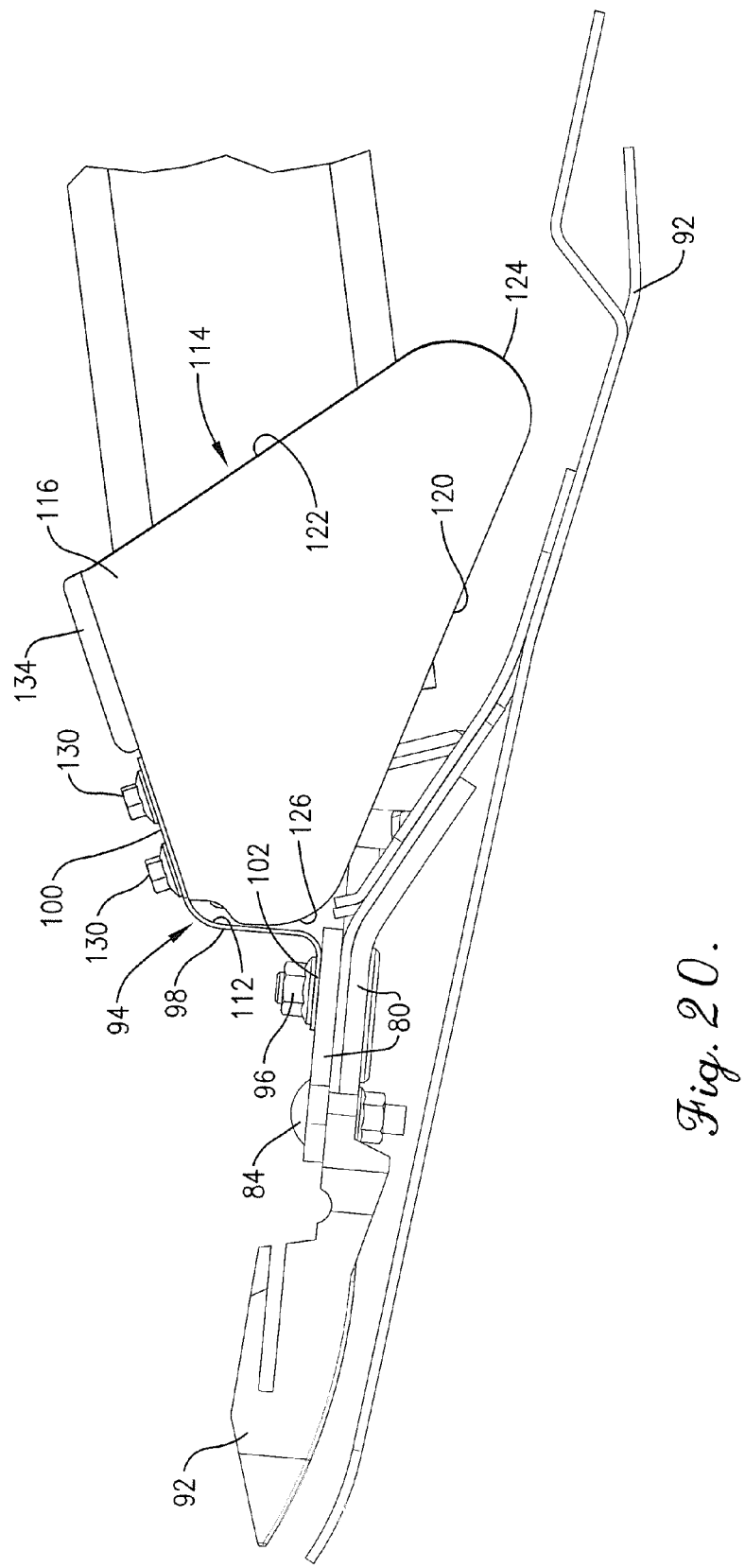
FIG. 20 is a fragmentary end elevational view of the deflector and otherwise open end of the endmost belt guard, parts being removed for clarity.
Figure 24:
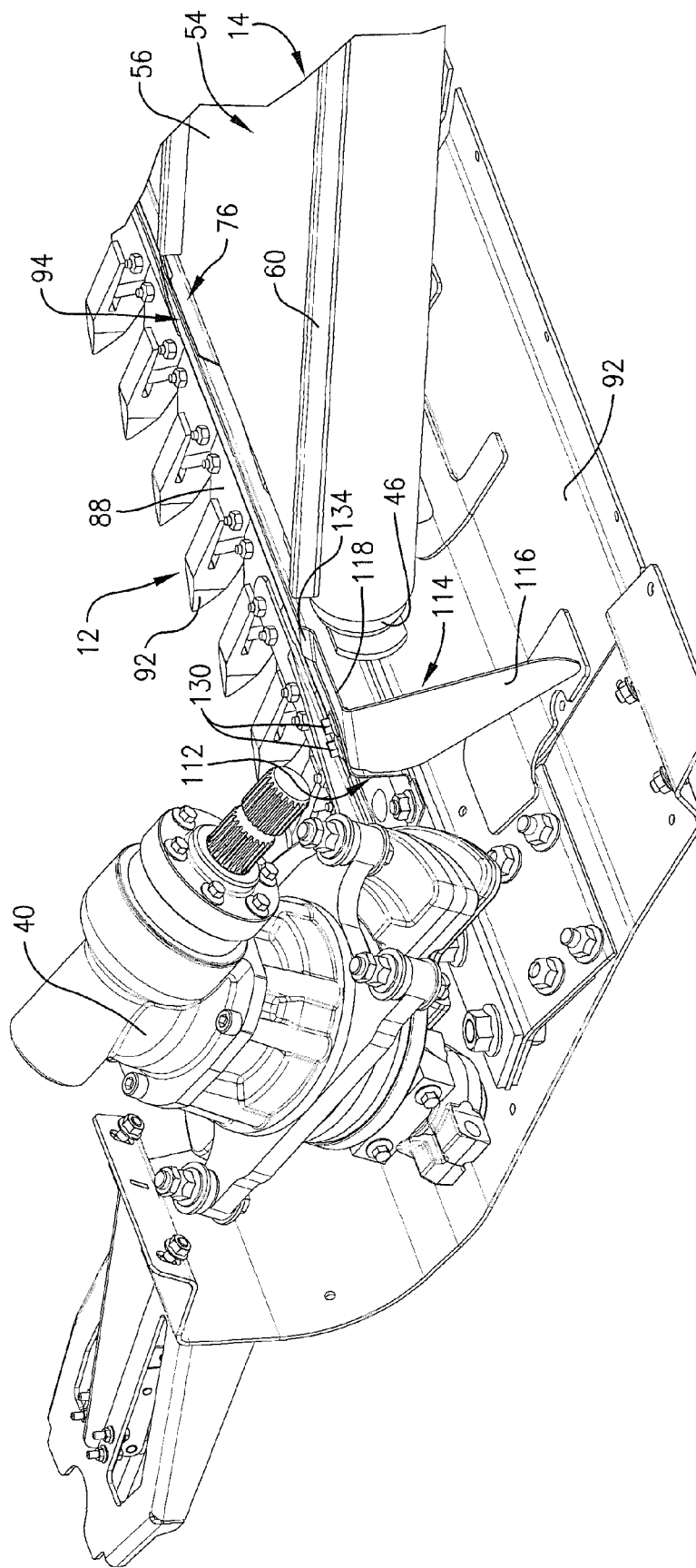
FIG. 24 is a fragmentary left rear perspective view of the left end of the header with parts removed to reveal the deflector and its relationship to other adjacent components.

FIGS. 19-32 are directed to a preferred and alternative embodiments of a crop residue deflector for closing off the otherwise open outboard ends of the outboardmost belt guards 94 at opposite ends of the header. Referring initially to FIGS. 19 and 20, it will be seen that the profile of each outboardmost belt guard 94 is such that the outboard edge thereof defines an open end 112. Thus, open end 112 provides an entry point into the void region 110 for residue. Even though void region 110 is sealed along its top rear extremity by front dam wall 76 and overhanging belt guard portion 100, open end 112 can potentially present a problem.

To overcome this problem, a residue deflector 114 serves to effectively close off the otherwise open end 112 of the outboardmost guard 94. Deflector 114 comprises a generally L-shaped unitary body of sheet metal having a sidewall 116 and a top wall 118. Sidewall 116 is generally triangular in shape, with a normally lower forward edge 120 that conforms generally to the proximal upper surface of skid 92, although in the illustrated embodiment, edge 120 is spaced slightly above skid 92. A normally rear edge 122 of sidewall 116 converges normally downwardly and rearwardly toward edge 120 to intersect therewith in a rounded rear apex 124. Lower front edge 120 is truncated at its forwardmost extremity to turn upwardly and present a forwardmost edge 126 that generally matches the configuration of upright section 98 of guard 94. A normally fore-and-aft extending, convex bend 128 is defined at the intersection of sidewall 116 and top wall 118 to define an included angle on the concave side of bend 128 that is somewhat greater than 90°.

Top wall 118 is disposed to lie in a plane substantially corresponding to the plane of overhanging guard portion 100. Indeed, top wall 118 is adapted to fit up underneath overhanging portion 100 in abutting engagement therewith so that a narrow forward portion 118a can be fastened to overhanging portion 100 using bolts or other suitable fasteners. In the illustrated embodiment, a pair of bolts 130 serve as the fastening means, utilizing a pair of holes 132 in the forward portion 118a. Holes 109 in overhanging portion 100 (FIG. 19) provide clearance for bolts 130.

Top wall 118 has a generally rectangular rear portion 118b that is wider than the tapering front portion 118a so as to project rearwardly beyond overhanging portion 100 as an extension thereof. Top wall 118, particularly rear portion 118b thereof, thus serves as a cover or shield over the region rearwardly beyond overhanging portion 100 and outboard of the outboard belt roller 46. Due to the adjustability of belt roller 46, the extent to which top wall 118 covers the open region outboard of belt roller 46 can vary, depending upon the adjusted position of roller 46. Preferably, top wall 118 has an upturned lip 134 along the inboard edge of rear portion 118a. Preferably also, deflector 114 fits under guard 94 to such an extent that sidewall 116 is substantially flush with the outboard edge of upright section 98 of guard 94. Deflector 114 is preferably oriented such that sidewall 116 flares slightly outwardly and rearwardly when installed in place.

Figure 30:
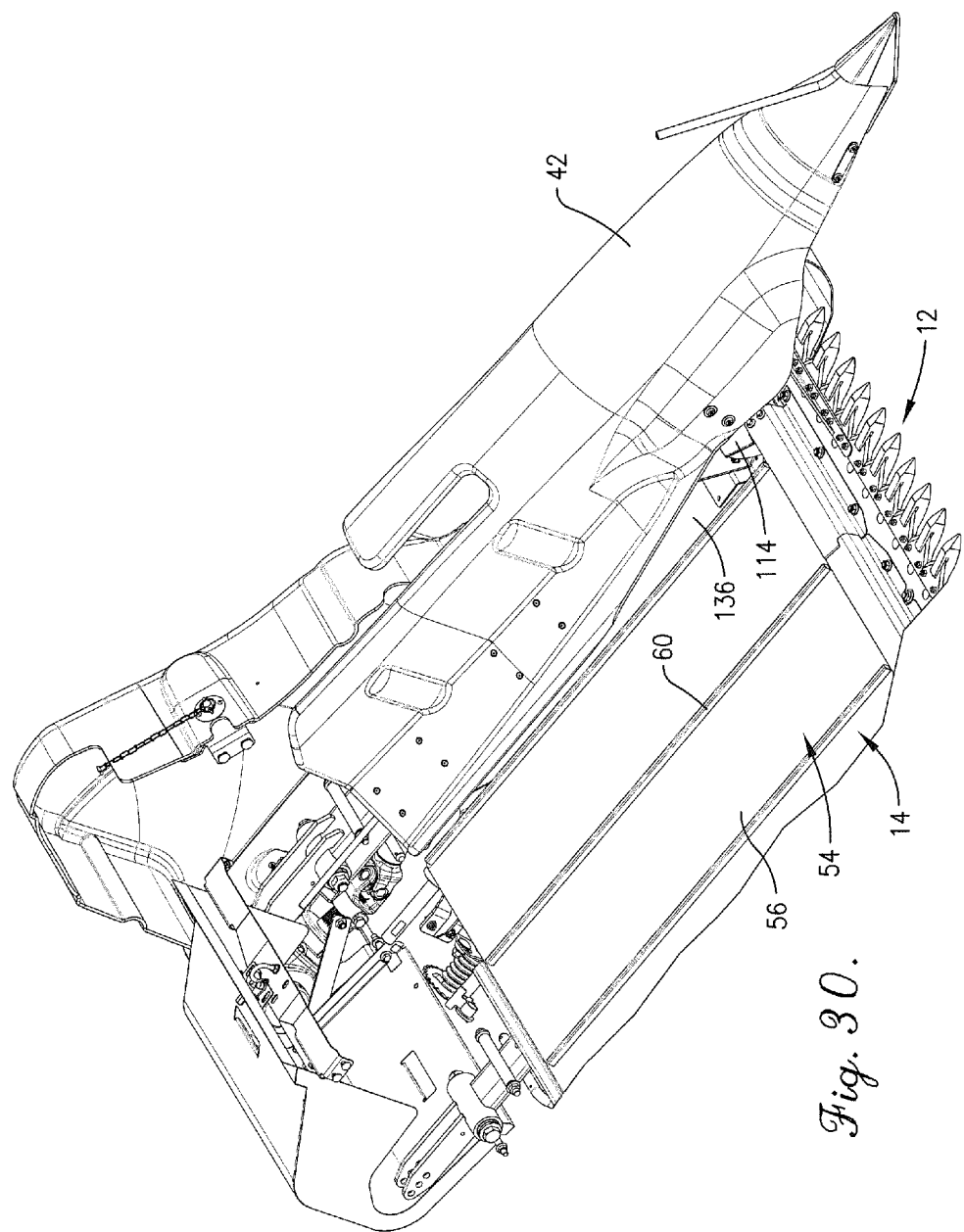
FIG. 30 is fragmentary, left front perspective view of the left end of the header illustrating the relationship between the crop divider housing and the first deflector embodiment of FIG. 19.
Figure 31:
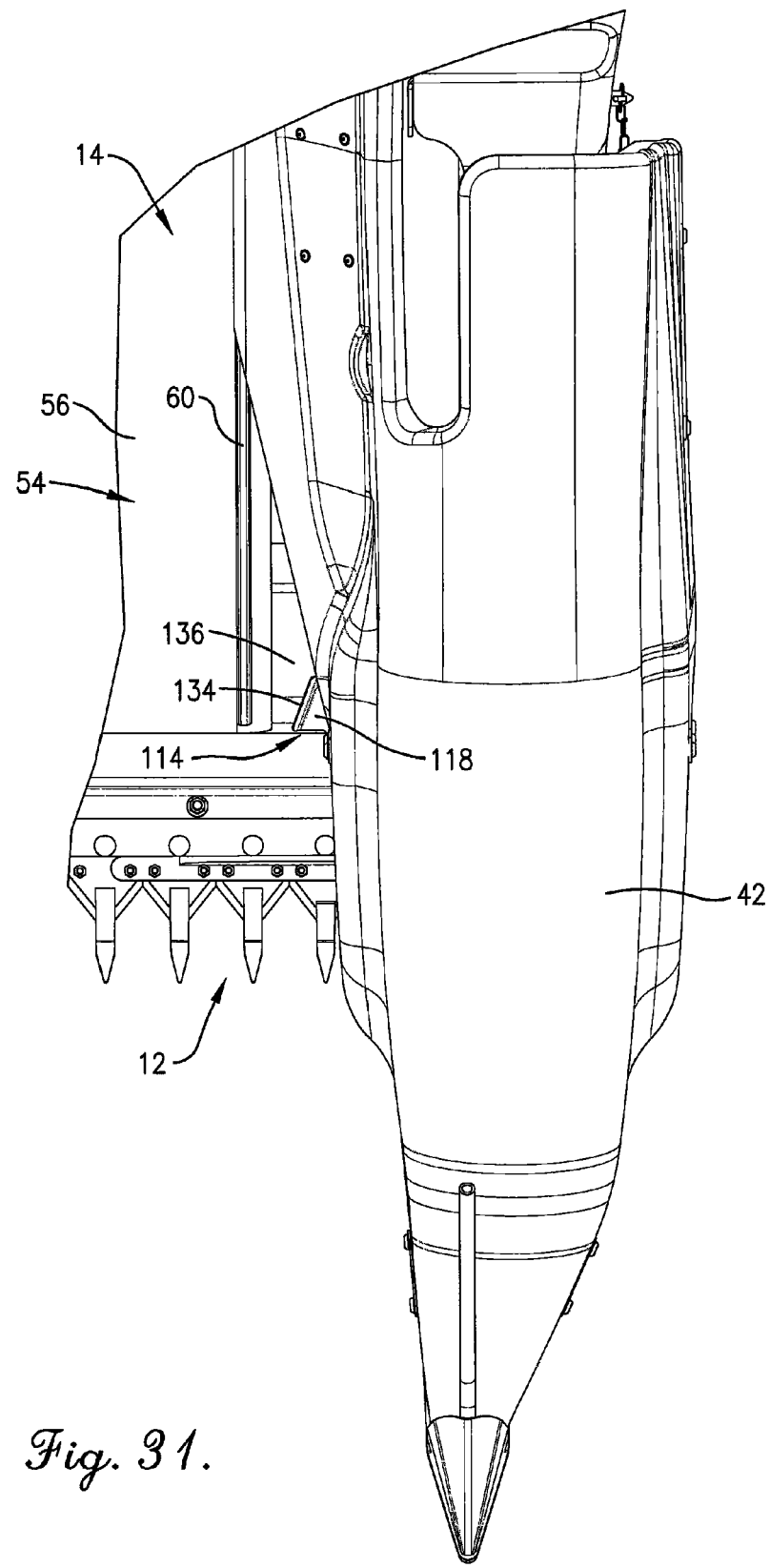
FIG. 31 is a fragmentary top plan view of the left end of the header, particularly illustrating the relationship between the crop divider housing and the residue deflector of FIG. 19.
Figure 32:
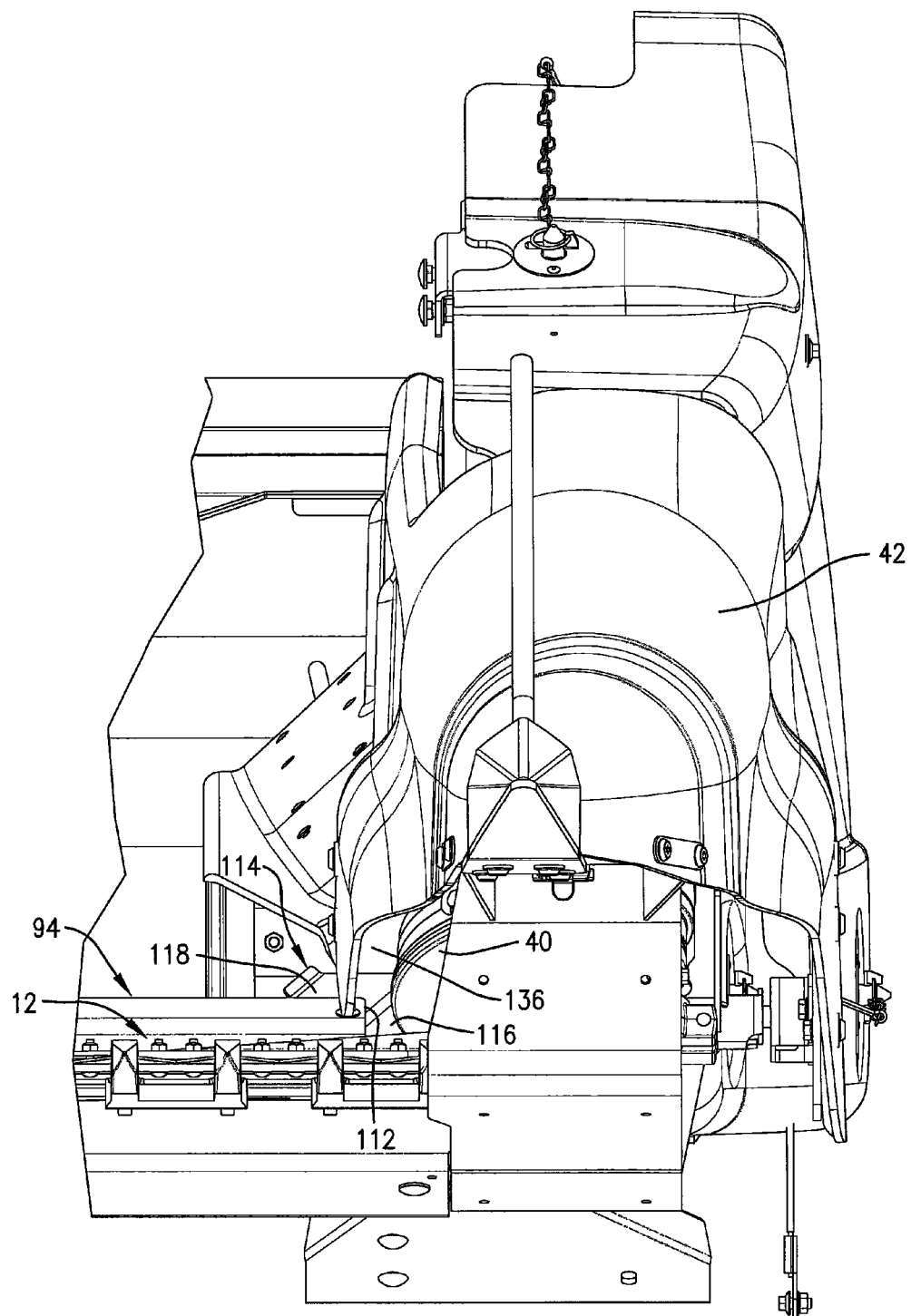
FIG. 32 is a fragmentary, bottom front perspective view of the left end of the header illustrating the relationship between the divider housing and the residue deflector of FIG. 19.

FIGS. 30, 31, and 32 illustrate that the cutterbar assembly 12 has "live" cutting elements (the knife sections 88) operating in a region outboard of the outboard end of each draper assembly 14, 16 (draper assembly 14 being illustrated as an example for both draper assemblies). In this respect, it will be appreciated that crop materials are being cut in that region of cutterbar assembly under divider 42, notwithstanding the fact that the outboard end of draper assembly 14 is disposed inboard of such cutting action. This defines a potential collecting space 136 for residue in the region outboard of draper assembly 14 and behind cutterbar assembly 12. While the contours of divider housing 42 help direct and deflect severed crop onto draper assembly 14 in the desired manner, there is still a tendency for residue, particularly wheat straw, to accumulate within space 136. Due to the existence of moving components of sickle drive mechanism 40 in the near vicinity, there is a tendency for the straw residue to become progressively more and more disintegrated and to migrate toward the open end 112 of outboardmost belt guard 94. Having the deflector 114 in this area, however, substantially prevents the ingress of such residue into void region 110 under belt guards 94.

FIGS. 25 and 26 are directed to a second embodiment of deflector, the primary differences between this embodiment and the previous embodiment relating to the manner in which the deflector is mounted. In this respect, deflector 114A is similar in shape to deflector 114 and serves to close off the open end 112 of the outboardmost guard 94 in the same manner as the first embodiment. Thus, deflector 114A has a sidewall 116A and a top wall 118A very much like sidewall 116 and top wall 118 of deflector 114. However, instead of being fastened to the outboardmost belt guard 94, deflector 114A is fastened to a nearby skid 92. For this purpose sidewall 116A is provided with an inturned foot 138A having a hole 140A for receiving a suitable fastener such as a bolt 142A for securing deflector 114A to skid 92. The function and operation of deflector 114A is the same in all respects as that of deflector 114.

FIGS. 27-29 illustrate a third embodiment of residue deflector. In this embodiment, deflector 114B is virtually identical to deflector 114A, with the exception that top wall 118B is also provided with mounting holes 132B as in the first embodiment. Deflector 114B is adapted to be secured to both the outboardmost belt guard 94 and a proximal skid 92 as illustrated in FIG. 27. Bolts 130B serve to attach deflector 114B to the outboardmost guard 94, while bolt 142B serves to attach deflector 114B to the skid 92. The function and operation of deflector 114B is identical in all respects to the function and operation of deflectors 114 and 114A.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. A harvesting header comprising:
   a flexible cutterbar assembly extending transversely across a front portion of the header with respect to the normal direction of travel of the header,
   said cutterbar assembly being operable to flex up and down along the length thereof in response to changes in terrain as the header is advanced;
   a flexible draper assembly supported behind the cutterbar assembly in a manner to permit the draper assembly to flex with the cutterbar assembly,
   said draper assembly including an endless, flexible, laterally movable belt presenting top and bottom belt runs,
   said top belt run presenting a front edge; and
   a plurality of belt guards attached to and disposed along the cutterbar assembly to accommodate and move with the cutterbar assembly during flexing thereof, each of said guards including a rearwardly projecting section disposed at a level above the level of said front edge of the top belt run, such that a vertical gap is defined between the levels of the top belt run and each belt guard,
   said draper assembly including a front dam wall disposed forwardly of said front edge of the top belt run and extending upwardly into interference contact with an underside of said rearwardly projecting section of the guard, with the front dam wall spanning the gap to restrict crop materials from falling through the gap.

2. A harvesting header as claimed in claim 1,
   said rearwardly projecting section of the guard extending rearwardly beyond said dam wall without substantially overlapping said front edge of the top belt run.

3. A harvesting header as claimed in claim 1,
   said front dam wall having an upper, non-resilient edge.

4. A harvesting header as claimed in claim 3,
   said draper assembly including a flexible support panel between the top and bottom belt runs for supporting at least a portion of the top run during lateral movement of the belt, with the support panel including the front dam wall.

5. A harvesting header as claimed in claim 1,
   said front dam wall having an upper resilient edge.

6. A harvesting header as claimed in claim 5,
   said draper assembly including a flexible support panel between the top and bottom belt runs for supporting at least a portion of the top run during lateral movement of the belt, with the support panel including the front dam wall.

7. A harvesting header as claimed in claim 6,
   said front dam wall comprising a lower upright portion integral with the remainder of the support panel and a resilient strip attached to the lower portion.

8. A harvesting header as claimed in claim 1,
   said draper assembly including a flexible support panel between the top and bottom belt runs for supporting at least a portion of the top run during lateral movement of the belt.

9. A harvesting header as claimed in claim 8,
   said draper assembly further including a plurality of fore-and-aft extending, laterally spaced apart arms disposed within the interior of said belt between the top and bottom belt runs,
   said arms being swingable up and down independently of one another with corresponding portions of the cutterbar assembly about rearwardly disposed pivots,
   said support panel comprising one of a plurality of individual, flexible support panels, each of which spans the distance between a pair of adjacent arms and is secured thereto at opposite lateral ends of the support panel.

* * * * *